United States Patent
Kildegaard

(10) Patent No.: US 7,163,378 B2
(45) Date of Patent: Jan. 16, 2007

(54) EMBEDDING ELEMENT TO BE EMBEDDED IN THE END PART OF A WINDMILL BLADE, A METHOD PRODUCING SUCH AN EMBEDDING ELEMENT AS WELL AS EMBEDDING OF SUCH EMBEDDING ELEMENTS IN A WINDMILL BLADE

(75) Inventor: Casper Kildegaard, Kolding (DK)

(73) Assignee: LM Glasfiber A/S, Lunderskov (DK)

( * ) Notice: Subject to any disclaimer, the term of this patent is extended or adjusted under 35 U.S.C. 154(b) by 44 days.

(21) Appl. No.: 10/501,556

(22) PCT Filed: Jan. 10, 2003

(86) PCT No.: PCT/DK03/00013
§ 371 (c)(1),
(2), (4) Date: Jul. 15, 2004

(87) PCT Pub. No.: WO03/057457
PCT Pub. Date: Jul. 17, 2003

(65) Prior Publication Data
US 2005/0106029 A1 May 19, 2005

(30) Foreign Application Priority Data
Jan. 11, 2002 (EP) .................................. 02388002

(51) Int. Cl.
*F03D 11/00* (2006.01)

(52) U.S. Cl. ...................................... 416/230; 416/248

(58) Field of Classification Search ............ 416/229 R, 416/230, 239, 248
See application file for complete search history.

(56) References Cited

U.S. PATENT DOCUMENTS

| | | | | |
|---|---|---|---|---|
| 2,984,453 A | * | 5/1961 | Heymann | ............... 416/229 R |
| 3,799,701 A | * | 3/1974 | Rothman | ..................... 416/226 |
| 4,915,590 A | | 4/1990 | Eckland et al. | ............. 416/225 |

FOREIGN PATENT DOCUMENTS

| DE | 19625426 | 1/1998 |
|---|---|---|
| GB | 2119472 | 11/1983 |

* cited by examiner

Primary Examiner—Ninh H. Nguyen
(74) Attorney, Agent, or Firm—Donald S. Dowden

(57) ABSTRACT

An embedding element (11) for embedment in the root of a wind turbine rotor blade (15) of a fibre composite material, said embedding element being elongated and having a first end portion (1) and a second end portion (2) and provided with fastening means, eg a threaded hole, a threaded rod or the like in its first end portion (1). Between its two end portions (1, 2) the embedding element (11) is provided with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis. The invention further relates to a method of producing such an embedding element, a method of producing a wind turbine blade (15) of fibre composite material, a plurality of embedding elements (11) being embedded such in juxtaposition in the blade root that they follow the circumference of the root and the concave lateral face (14) of each embedding element (11) engaging the convex lateral face (16) of a juxtaposed embedding element and allowing access to the fastening means (24) from the outside.

15 Claims, 3 Drawing Sheets

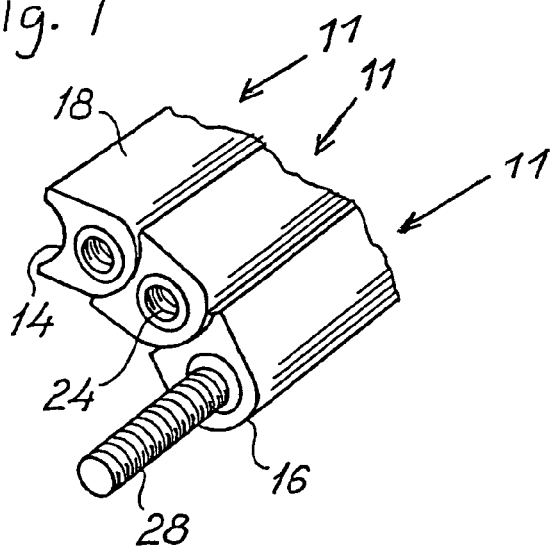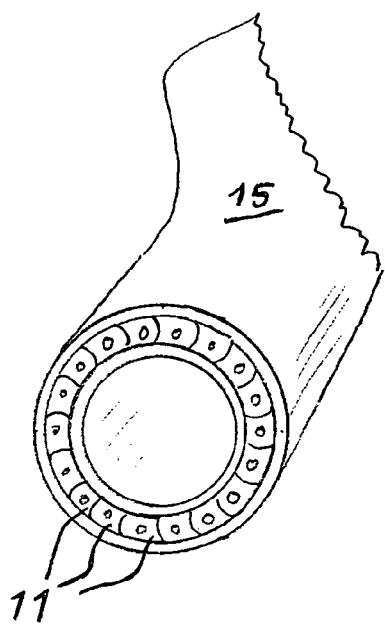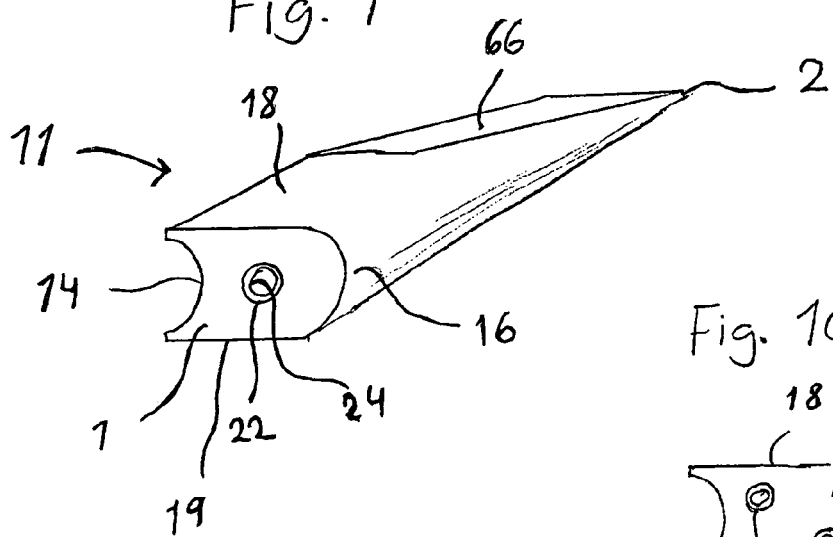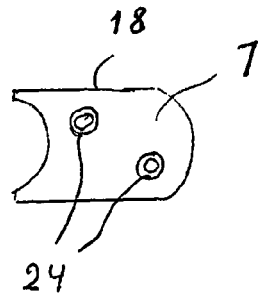

EMBEDDING ELEMENT TO BE EMBEDDED IN THE END PART OF A WINDMILL BLADE, A METHOD PRODUCING SUCH AN EMBEDDING ELEMENT AS WELL AS EMBEDDING OF SUCH EMBEDDING ELEMENTS IN A WINDMILL BLADE

TECHNICAL FIELD

The invention relates to an embedding element for embedment in the root of a wind turbine rotor blade, said element being elongated and having a first end portion and a second end portion and provided with fastening means, eg a threaded hole, a threaded rod or the like in its first end portion.

The invention further relates to a method of producing such an embedding element, a method of producing a wind turbine rotor blade, in which a plurality of embedding elements are embedded, and a wind turbine rotor blade.

BACKGROUND ART

The fastening of fibre composite components, eg polymer components of fibre glass or carbon fibres, which are subjected to loads from other structural elements, is often troublesome. One of these problems occurs when a wind turbine blades is to be secured to the hub of the wind turbine in such a manner that the connection therebetween is able to transfer heavy dynamic forces. The end face of a rotor blade root is often circular and secured to a circular metal flange on the turbine hub by means of bolts or threaded rods.

U.S. Pat. No. 4,915,590 discloses several methods for attaching the root of a wind turbine blade to a flange on the hub. The publication thus discloses a method, whereby the blade wall in the root is provided with embedded, elongated embedding elements in form of sucker rods comprising a fibre glass rod, one end of the rod being provided with a coupling in form of a female-treaded steel bushing. The embedding elements are embedded such in the blade wall at the root that the female thread of the steel bushings is accessible from the end face of the blade root for attachment thereof to the hub.

One drawback of this method is that it is time-consuming to position the embedding elements accurately in the mould and subsequently thereto place fibre mats in abutment with the element to ensure a durable embedment. Due to the circular shape of the rods, the fibre mats have to be pushed downwards on either side, and even if this is achieved, folds are created in the fibres/fibre mats which weaken the strength and which in turn cause a risk of delamination due to the heavy dynamic loads.

DESCRIPTION OF THE INVENTION

The object of the invention is to provide a new and improved embedding element for embedment in a wind turbine blade made of fibre composite material allowing for a simplified embedment process and ensuring increased strength at fixation of the wind turbine blade to the turbine hub.

According to the invention the object is obtained in that between its two end portions the embedding element is provided with a first longitudinal lateral face extending substantially concavely in a cross-sectional view perpendicular to the longitudinal axis of the embedding element, and with a second longitudinal lateral face facing opposite the first lateral face and extending substantially correspondingly convexly in a cross-sectional view perpendicular to the longitudinal axis. As a result it is possible to lay up the embedding elements in alignment such that a concave lateral face engages a convex lateral face, whereby the positioning of the elements is facilitated. Due to the concavity/convexity the embedding elements may rotate in relation to each other about their longitudinal axis to allow adaptation thereof to various curve shapes, eg to the circular cross-sectional shape of a blade root. The same type of embedding element may thus be used for blade roots of different diameters, the number of embedding elements used naturally depending on the diameter. The embedding element may also be used for other composite components, such as aeroplane wings for securing these to the fuselage, said wings having a substantially elliptic cross section.

According to an embodiment the embedding element may have a tapering shape in the direction towards the second end, whereby the fibre lay-up may be performed during the embedding process without causing sharp bends in the fibres or fibre mats in the transitional area between the second end of the embedding element and the composite component. If the rigidity of the embedding element differs from that of the fibre composite material, a gradual transition in the rigidity of the finished fibre composite component is also obtained.

According to a preferred embodiment the embedding element has an upper face and a lower face interconnecting the concave lateral face and the convex lateral face, the upper face and the lower face extending gradually convergently towards the second end portion of the embedding element to provide a wedge-shaped embedding element. As a result a tapering shape is obtained, while ensuring that the longitudinal axes of the embedding elements extend in parallel.

According to a preferred embodiment the embedding element is made substantially of a fibre composite material, whereby a complete fibre composite component having homogenous material properties in relation to rigidity and strength and thermal expansion is obtained.

The invention also relates to a method of producing the above embedding element, wherein an elongated core element, preferably of a fibre composite material and preferably made by pultrusion, is provided, a fastening member being arranged at the first end of the core element and the core element with the fastening member being secured inside a casing by means of adhesion, said casing including the concave and the convex lateral faces and preferably made of a fibre composite material, preferably by pultrusion. A solid embedding element may thus be produced in a simple manner by means of such a method.

According to a preferred embodiment of the method the first end of the core element is conical and the inwardly facing end of the fastening member is provided with a corresponding conical recess or vice versa. As a result, the two parts may be accurately fixed in relation to each other and the embedding element is provided with a strong fixation and increased strength.

According to an advantageous embodiment two embedding elements are produced simultaneously by arranging a fastening member at either end of the core element prior to the encasement thereof inside the casing, and subsequently making an inclined, plane cut from the upper face to the lower face or vice versa to produce two wedge-shaped embedding elements. This method offers a particularly simple manufacture of wedge-shaped embedding elements and is also advantageous in that safety checks may be carried out by measuring the tensile strength through the fastening means in both end portions and in that a tensile test may be performed before the two elements are separated.

The invention further relates to a method of producing a wind turbine rotor blade of a fibre composite material, a plurality of embedding elements being embedded such in juxtaposition in the blade root that they follow the circumference of the root cross section, which may be circular, and the concave lateral face of each embedding element engaging the convex lateral face of a juxtaposed embedding element and allowing access from the outside to the fastening means which may be used for securing the blade to a flange on a wind turbine hub.

The invention also relates to a wind turbine made by means of such a method.

BRIEF DESCRIPTION OF THE DRAWINGS

The invention is described in greater detail below with reference to the accompanying drawings, in which FIG. 7 is a schematic view of how three embedding elements according to the invention may be embedded in relation to each other in a fibre composite component, FIG. 8 is a perspective view of the root of a wind turbine blade, embedded embedding elements according to the invention being schematically shown, FIG. 9 is a perspective view of an embedding element according to the invention, and FIG. 10 illustrates an alternative embodiment of an embedding element according to the invention seen from the first end portion.

BEST MODE(S) FOR CARRYING OUT THE INVENTION

Figure 1:
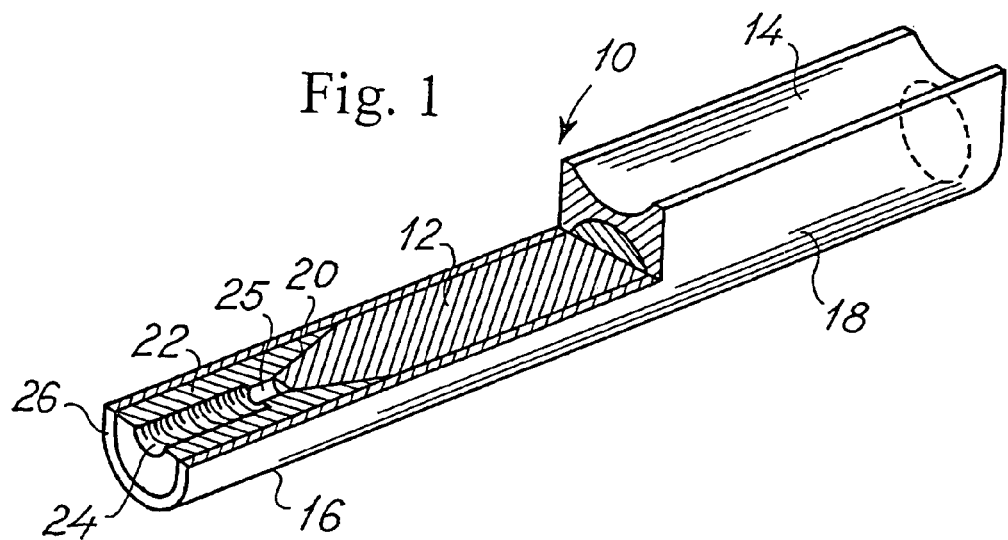
FIG. 1 is a partly sectional, perspective view of a first embodiment of a blank from which two embedding elements are produced.

FIGS. 1–6 primarily relate to a method of producing an embedding element according to the invention. The embedding element is shown in a perspective view in FIG. 9 and includes an elongated body having a first end portion 1 and a second end portion 2. The embedding element 11 has a substantially planar upper face 18 and a planar lower face 19 parallel to the upper face. The planar upper face 18 passes into an inclined surface 66 extending downwardly towards the lower face 19 such that the embedding element becomes wedge-shaped and tapers towards the second end portion 2. The first end portion houses an embedded fastening member 22 in form of a metal bushing with a threaded hole 24. The embedding element further has a concave, circular cylindrical lateral face 14 extending in entire length of the embedding element and opposite the lateral face 14 a corresponding convex circular cylindrical lateral face 16 also extending in the entire length of the embedding element.

As shown in FIG. 7, several embedding elements 11 may be arranged in parallel to allow the convex lateral faces 14 to engage the concave lateral faces 16 and such that the longitudinal axes of the elements extend in parallel. Due to the concave and convex lateral faces, the embedding elements may extend along a curve, eg a circle, in a plane perpendicular to the longitudinal axes of the embedding elements 11.

FIG. 8 illustrates the root portion of a wind turbine rotor blade 15 made of a fibre composite material. Schematically shown embedding elements 11 are embedded in the root along the circumference thereof such to allow access to the threaded holes 24 of the embedding elements 11 from the end face of the blade root.

Wind turbine blades are typically made by means of two blade shell halves of fibre-reinforced polymer. When moulded the two halves are glued together along the edges and via two bracings, which prior thereto have been glued to the inner face of one the blade shell halves. The other blade shell half is then arranged on top of bracings and glued thereto and along the edges. The blade shell halves per se are typically made by vacuum infusion, in which evenly distributed fibres, rovings, which are fibre bunches, bands of rovings or mats, which may be felt mats of single-fibres or woven mats of fibre rovings, are layered in a mould part and cover by a vacuum bag. By creating vacuum in the cavity between the inner face of the mould part and the vacuum cloth resin is sucked into and fills the cavity containing the fibre material. Some form of fastening means are to be provided in the end face of the blade root in order to securely fix the blade to the wind turbine hub.

The embedding elements 11 according to the invention are particularly suitable for the provision of fastening means in the end face of the blade root, as they are able to rotate in such a manner in relation to each other due to the concave and convex lateral faces 14, 16 that they abut each other regardless of the diameter of the blade root.

The embedment of the embedding elements 11 typically comprises the following steps: Each of the embedding elements is secured to the root flange of the mould part, said flange being a strong metal plate with apertures corresponding to the flange provided on the turbine hub on which the blade is to be mounted. A fibre glass mat is placed on the convex lateral face 14 of each embedding element 11, said mat being cut into shape before the next embedding element is secured. As a result a small spacing is provided between embedding elements 11 allowing for a subsequent injection of resin between the embedding elements resulting in an improved embedment.

Due to the tapering shape of the embedding elements 11, a uniform material transition from the embedding element to the other blade material, whereby stress concentrations are avoided.

FIG. 10 illustrates an optional embodiment, in which the first end portion 1 of each embedding element 11 is provided with two threaded holes at different distances from the upper face 18. This embodiment is advantageous in that two bolt circles are obtained, whereby the diameter of the blade root may be reduced, which in turn reduces the costs of the turbine hub and the like.

A method of producing the embedding elements according to the invention is explained in details below with reference to FIGS. 1–6.

FIG. 1 is a perspective and partly sectional view of a blank 10 for the manufacture of two embedding elements 11 according to the invention. The blank 10 is formed substantially of a core element 12, two fastening members 22, of which only one is visible, and an outer casing 18. The core element 12 is provided with conically tapered ends 20 fitting into conical recesses 20' in the fastening members 22, confer FIG. 3. A through-going hole 25 extends from the bottom of the conical recess 20' to the opposite outer end of the fastening member 22. A portion of the hole 25 is provided with a thread 24. The outer casing 18 has a longitudinal, concave, circular cylindrical lateral face 14 and a longitudinal, convex circular cylindrical lateral face 16 arranged opposite the concave face 14.

Figure 2:
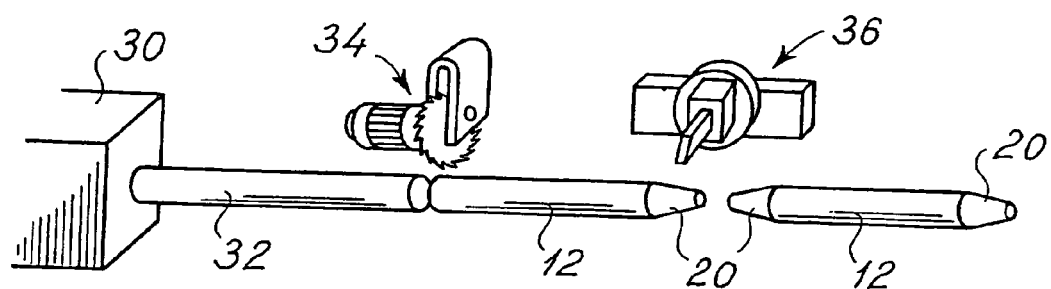
FIG. 2 is schematic view of a method of producing a core element for the blank shown in FIG. 1.

FIG. 2 is a schematic view of how the core elements 12 are produced. A portion of a pultrusion device 30 is shown, in which a string of pultruded fibre composite material 32 extend. A saw 34 cuts the string 32 into lengths corresponding to the length of each core element 12 and a cutting device shapes the ends 20 of the core element 12 such that they become conical.

Figure 3:
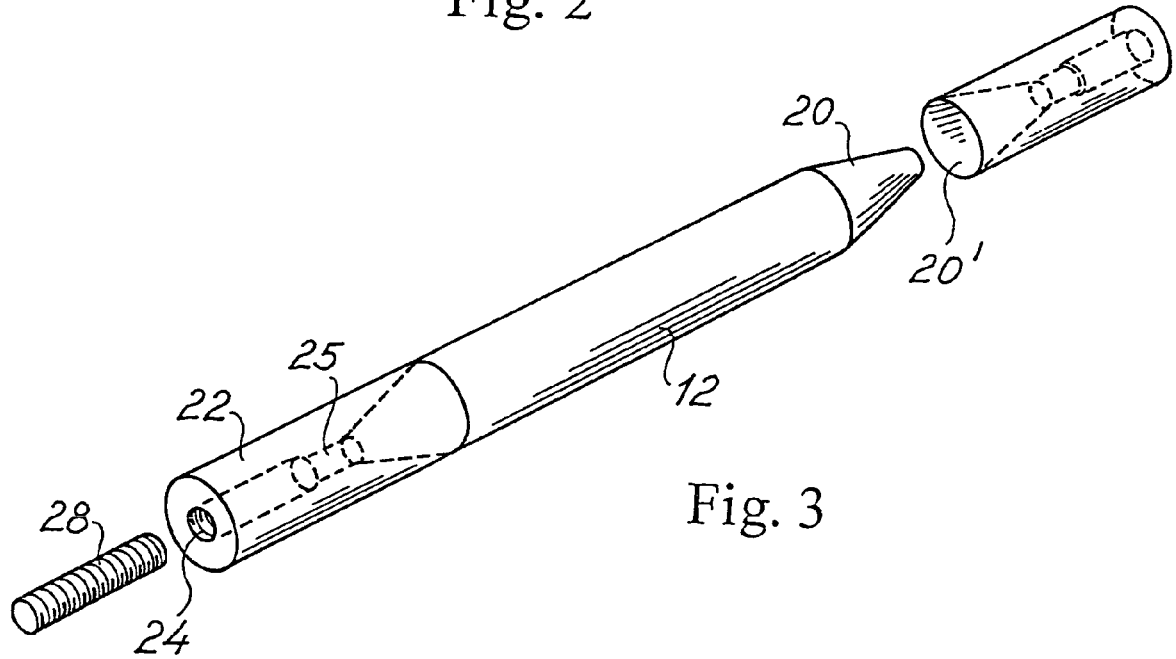
FIG. 3 is a schematic view illustrating the fastening of the fastening means to the core element.

FIG. 3 shows how the ends 20 of the core element 12 may be glued into the corresponding recesses 20' of the fastening members 22.

Having been glued to the ends of the core element 12, the fastening members 22 are secured by screws by means of the threaded rods 28 to additional core elements 12 with glued-on fastening members 22 so as to form a long rod.

Figure 4:
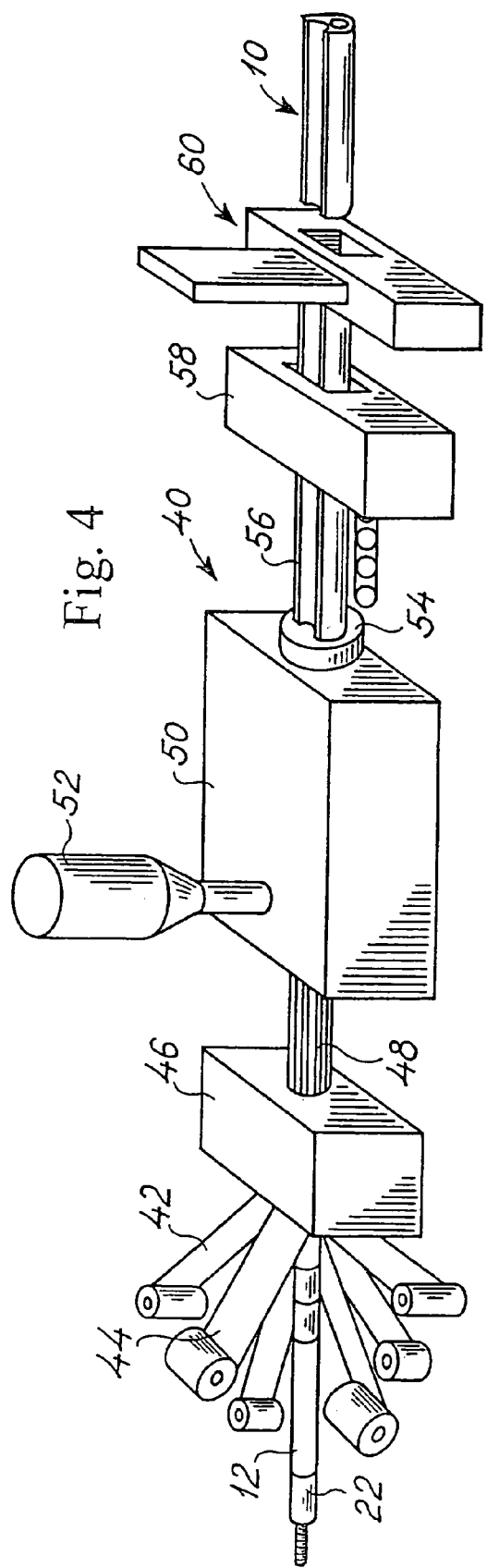
FIG. 4 is a schematic view of a pultrusion system for the manufacture of the blank shown in FIG. 1.

FIG. 4 illustrates a pultrusion system 40 in which the above rod is inserted into a receiving station 46 jointly with bands of fibre material 42, 44, the assembled string 48 formed of the rod and the fibre material 42, 44 is then inserted into a heat and curing station 50. Resin is fed from a resin reservoir 52 into the heat and curing station 50 and saturates the fibre material in the string 48. The saturated string 48 is passed through a nozzle 54 from which a pultrusion string 56 extends, said string having a cross section corresponding to that of the blank shown in FIG. 1. The pultrusion string 56 is extracted from the nozzle by means of a pulling station 58. On the other side of the pulling station 58 a knife 60 cuts the pultrusion string 10 between two fastening members 22, whereby the blanks 10 are obtained. The threaded rods 28 may advantageously be made from plastic to facilitate the cutting action.

Figure 5:
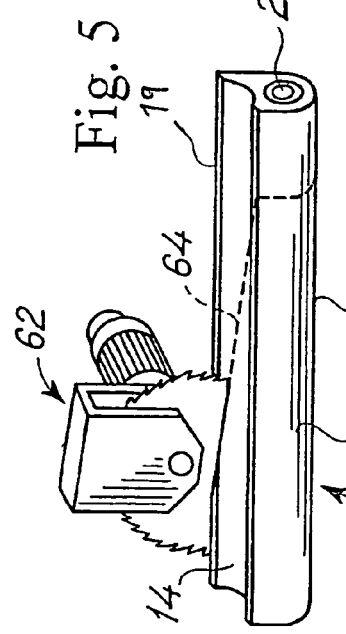
FIG. 5 is a schematic view illustrating the cutting of the blank shown in FIG. 1.

FIG. 5 illustrates how a saw 62 cuts through the blank 10 along an inclined cutting line 64 extending between the upper face 19 and the lower face 18.

Figure 6:
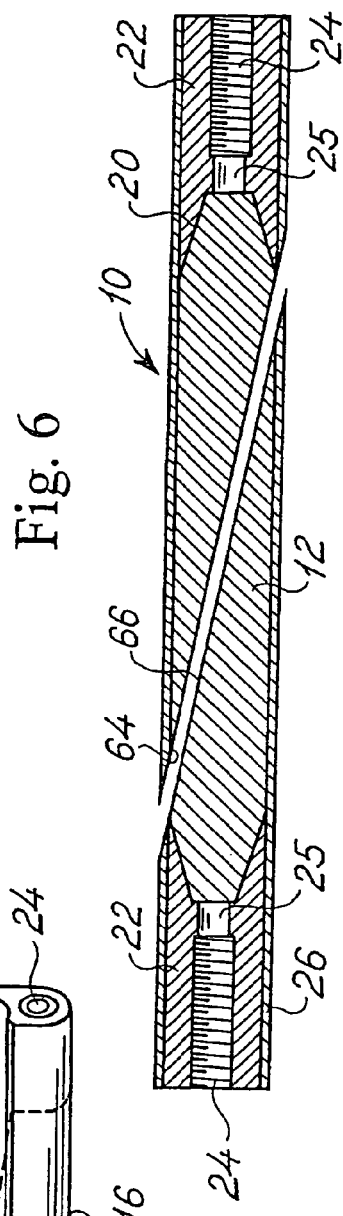
FIG. 6 is a sectional view of the blank shown in FIGS. 1 and 5 in its cut state.

FIG. 6 illustrates the cut blank 10 and how two embedding elements have been obtained, each with an inclined surface 64, 66.

In the method described above the casing 26 is provided by means of a so-called integral pultrusion process. It is, however, also possible to produce the casing 26 separately in a pultrusion process and then glue the core element 12 and the fastening member 22 onto the inside of the casing 26.

As the embedding element, except for the fastening member 22, which is made of steel, preferably is made of a fibre composite material, a homogenous structure with homogenous material properties is obtained, when the embedding elements are embedded into the fibre composite material.

The invention is not restricted to the above embodiments. The embedding element 11 may also be made of for instance wood or plastic, and the fastening members 22 may also be made of plastic or wood. If the embedding element is not made of a fibre composite material, its wedge shape contributes to forming a smooth transition between the material properties of the embedding elements and the properties of the material into which the embedding element is embedded.

The core element 22 and the fastening members 22 may formed integrally and may thus include a rod with a threaded hole in one or both ends and be made of metal, a fibre composite material, plastic or wood. The rod may be glued into the casing 26, whereafter an inclined cut is made to form two embedding elements.

The invention claimed is:

1. An embedding element (11) for embedment in the root of a wind turbine rotor blade (15) of a fibre composite material, said embedding element being elongated and having a first end portion (1) and a second end portion (2) and provided with fastening means (24), in its first end portion (1), characterised in that between its two end portions (1, 2) the embedding element (11) is provided with planar upper and lower surfaces (18, 19), with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis.

2. An embedding element according to claim 1, characterised in that it tapers in the direction towards the second end portion (2).

3. An embedding element according to claim 2 characterised in that upper face (18) and the lower face (19) interconnect the concave lateral face (14) and the convex lateral face (16), and the upper face (18) and the lower face (19) extend gradually convergently in relation to each other towards the second end portion (2) of the embedding element to provide a wedge-shaped embedding element.

4. A method of producing an embedding element according to claim 1, comprising the steps of providing an elongated core element (12), arranging a fastening member (22) including the fastening means (24) at the first end portion of the core element (12) and fixing the core element (12) with the fastening member (22) inside a casing (26) by means of an adhesive, said casing including the concave lateral face (15) and the convex lateral face (16).

5. An embedding element (11) for embedment in the root of a wind turbine rotor blade (15) of a fibre composite material, said embedding element being elongated and having a first end portion (1) and a second end portion (2) and provided with fastening means (24), in its first end portion (1), characterised in that between its two end portions (1, 2) the embedding element (11) is provided with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis, wherein the embedding element is made of a fibre composite material.

6. A method of providing an embedding element (11) for embedment in the root of a wind turbine rotor blade (15) of a fibre composite material, said embedding element being elongated and having a first endportion (1) and a second end portion (2) and provided with fastening means (24) in its first end portion (1), comprising the steps of providing the embedding element (11) between its two end portions (1, 2) with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis, providing an elongated core element (12), arranging a fastening member (22) including the fastening means

(24) at the first end portion of the core element (12) and fixing the core element (12) with the fastening member (22) inside a casing (26) by means of an adhesive, said casing including the concave lateral face (15) and the convex lateral face (16), and giving the first end (20) of the core element (12) a conical shape and shaping the inwardly facing end (20') of the fastening member (22) AS a corresponding conical recess or vice versa.

7. A method of producing two embedding elements (11) for embedment in the root of a wind turbine rotor blade (15) of a fibre composite material, each said embedding element being elongated and having a first end portion (1) and a second end portion (2) and provided with fastening means (24), in its first end portion (1), characterised in that between its two end portions (1, 2) each said embedding element (11) is provided with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis, providing an elongated core element (12), arranging a fastening member (22) including the fastening means (24) at the first end portion of the core element (12) and fixing the core element (12) with the fastening member (22) inside a casing (26) by means of an adhesive, said casing including the concave lateral face (15) and the convex lateral face (16), wherein a fastening member (22) is arranged at either end of the core element (12) prior to being encased in the casing (26), an inclined, plane cut subsequently being made from the upper face (18) to the lower face (19) or vice versa to provide two embedding elements (11) of wedge shape.

8. A method of producing a wind turbine rotor blade (15) of a fibre composite material, comprising the steps of providing a plurality of embedding elements (11), each said embedding element being elongated and having a first end portion (1) and a second end portion (2) and provided with fastening means (24), in its first end portion (1), characterised in that between its two end portions (1, 2) each said embedding element (11) is provided with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis, each said embedding elements being embedded such in juxtaposition in the blade root that they follow the circumference of the root cross section, the concave lateral face (14) of each embedding element (11) engaging the convex lateral face (16) of a juxtaposed embedding element and allowing access from the outside to the fastening means (24) which may be used for securing the blade (15) to a flange on a wind turbine hub.

9. A wind turbine blade (15) made by means of the method according to claim 8.

10. A method according to claim 8 comprising making the circumference of the root cross section circular.

11. A method of producing an embedding element (11) for embedment in the root of a wind turbine rotor blade (15) of a fibre composite material, said embedding element being elongated and having a first end portion (1) and a second end portion (2) and provided with fastening means (24), in its first end portion (1), characterised in that between its two end portions (1, 2) the embedding element (11) is provided with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis and forming the fastening means as a threaded hole or a threaded rod.

12. A method of producing an embedding element (11) for embedment in the root of a wind turbine rotor blade (15) of a fibre composite material, said embedding element being elongated and having a first end portion (1) and a second end portion (2) and provided with fastening means (24), in its first end portion (1), characterised in that between its two end portions (1, 2) the embedding element (11) is provided with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis, providing an elongated core element (12), arranging a fastening member (22) including the fastening means (24) at the first end portion of the core element (12) and fixing the core element (12) with the fastening member (22) inside a casing (26) by means of an adhesive, said casing including the concave lateral face (15) and the convex lateral face (16), and forming the elongated core element (12) from a fibre composite material.

13. A method according to claim 12 comprising making the elongated core element (12) by pultrusion.

14. A method of providing an embedding element (11) for embedment in the root of a wind turbine rotor blade (15) of a fibre composite material, said embedding element being elongated and having a first end portion (1) and a second end portion (2) and provided with fastening means (24), in its first end portion (1), characterised in that between its two end portions (1, 2) the embedding element (11) is provided with a first longitudinal lateral face (14) extending substantially concavely in a cross-sectional view perpendicular to the longitudinal axis of the embedding element, and with a second longitudinal lateral face (16) facing opposite the first lateral face (14) and extending substantially correspondingly convexly in a cross-sectional view perpendicular to the longitudinal axis, providing an elongated core element (12), arranging a fastening member (22) including the fastening means (24) at the first end portion of the core element (12) and fixing the core element (12) with the fastening member (22) inside a casing (26) by means of an adhesive, said casing including the concave lateral face (15) and the convex lateral face (16), and forming the casing (26) with a fibre composition material.

15. A method according to claim 14 comprising making the casing (26) by pultrusion.

* * * * *